United States Patent [19]

Tateno

[11] Patent Number: 4,561,052
[45] Date of Patent: Dec. 24, 1985

[54] INSTRUCTION PREFETCH SYSTEM

[75] Inventor: Haruo Tateno, Tokyo, Japan

[73] Assignee: Tokyo Shibaura Denki Kabushiki Kaisha, Kawasaski, Japan

[21] Appl. No.: 415,438

[22] Filed: Sep. 7, 1982

[30] Foreign Application Priority Data

Sep. 18, 1981 [JP] Japan .................. 56-147210

[51] Int. Cl.[4] .......................... G06F 13/00; G06F 9/16
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,202,969 | 8/1965 | Dunwell et al. | 364/200 |
| 3,840,861 | 10/1974 | Amdahl et al. | 364/200 |
| 3,881,173 | 4/1975 | Larsen et al. | 364/200 |
| 4,062,058 | 12/1977 | Haynes | 364/200 |
| 4,110,822 | 8/1978 | Porter et al. | 364/200 |
| 4,112,489 | 9/1978 | Wood | 364/200 |
| 4,156,925 | 5/1979 | Tutt et al. | 364/200 |
| 4,187,539 | 2/1980 | Eaton | 364/200 |
| 4,200,927 | 4/1980 | Hughes et al. | 364/200 |
| 4,439,828 | 5/1984 | Martin | 364/200 |

Primary Examiner—James D. Thomas
Assistant Examiner—William G. Niessen
Attorney, Agent, or Firm—Kenyon & Kenyon

[57] ABSTRACT

A pipelining information processor which includes a memory, an instruction buffer, an execution stage, a logical address generator coupled with the instruction buffer, a physical address generator, and logic for fetching an instruction from the instruction buffer to the execution stage. The input to the physical address generator is selected by a selector as either a logical address of the operand of a prefetched instruction or a logical address of an instruction to be prefetched. If the prefetched instruction requires a memory access, the logical address of its operand is selected, otherwise the logical address of a new instruction to be prefetched is selected. Control logic sequentially moves instruction addresses through the selector, the instruction buffer, the logical address generator, and the physical address generator so that logical address generation, physical address modification, fetching a prefetched instruction from the instruction buffer to the execution stage, and execution may occur in parallel on successive instructions.

2 Claims, 18 Drawing Figures

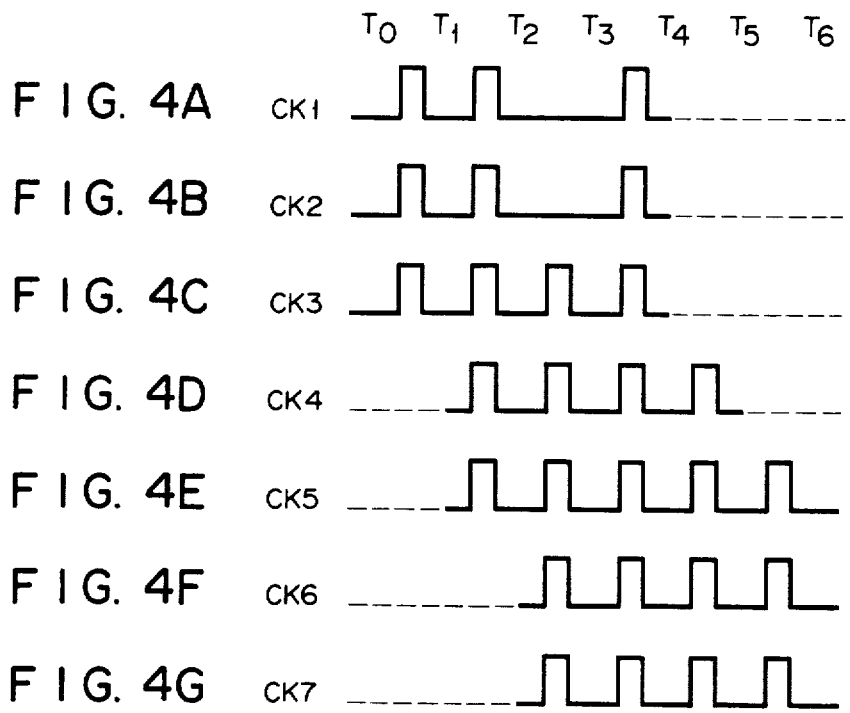
FIG. 4A CK1
FIG. 4B CK2
FIG. 4C CK3
FIG. 4D CK4
FIG. 4E CK5
FIG. 4F CK6
FIG. 4G CK7
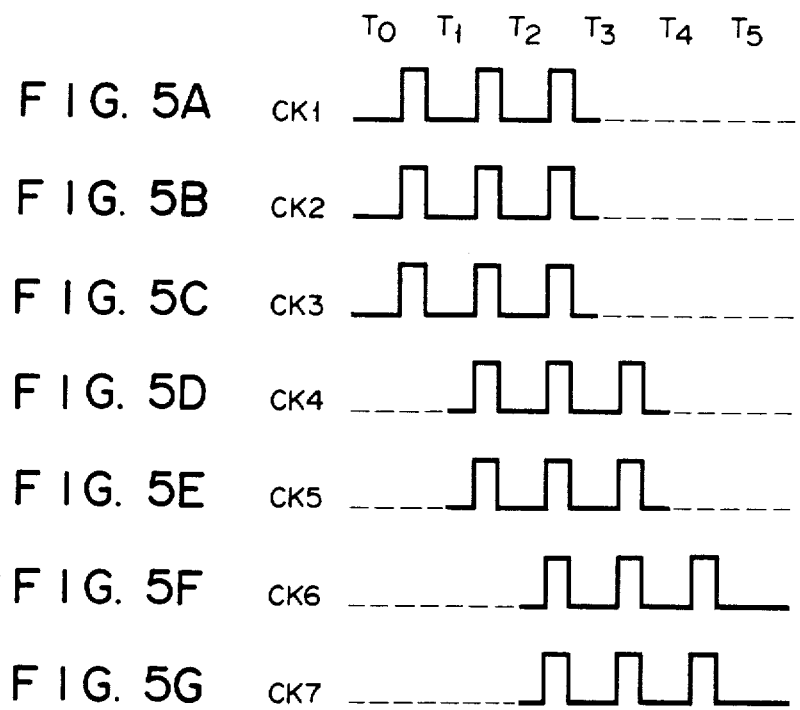
FIG. 5A CK1
FIG. 5B CK2
FIG. 5C CK3
FIG. 5D CK4
FIG. 5E CK5
FIG. 5F CK6
FIG. 5G CK7

INSTRUCTION PREFETCH SYSTEM

BACKGROUND OF THE INVENTION

The present invention relates to an instruction prefetch system for an information processor which has an instruction buffer and which adopts the pipelining processing method.

In a conventional information processor with an instruction buffer, sequence control of instructions by pipelining is performed according to the following procedure: (i) an operand logic address register and an instruction buffer supplement (instruction prefetch) address register are selected by the selector, and a physical address is generated by a common physical address generator; and (ii) the common memory (main memory or the buffer memory) is accessed to selectively supply operand data to the execution stage and an instruction word to the instruction buffer, respectively. During the supplement (prefetch) of the instruction word into the instruction buffer, processing and transmission (to be referred to simply as "instruction fetch" hereinafter) for execution of an instruction fetched from the instruction buffer cannot be executed.

However, of the instructions which are fetched in this manner, some do not require memory access such as an operation between registers and an immediate operation. In this case, since memory competition does not occur, the instruction fetch may be performed during prefetch. However, instruction prefetch is conventionally interrupted even in this case.

SUMMARY OF THE INVENTION

It is an object of the present invention to provide an instruction prefetch system which eliminates the drawbacks of the prior art as described above, and which is capable of performing an instruction fetch which does not involve memory access parallel to instruction buffer supplement or prefetch processing, so that pipelining processing may be efficiently performed and the operation processing speed may be improved.

In order to achieve the above object, there is provided according to the present invention an instruction prefetch system of an information processor of pipelining type wherein an instruction code and an operand are supplied to an execution stage and an instruction to be executed is fetched in an instruction buffer by a memory access mechanism which has an address generator which selectively receives an operand address and a prefetch address of said instruction buffer and which has an address generator for generating physical addresses for the operand address and the prefetch address, comprising:

first detecting means for detecting that the instruction to be executed does not require memory access;

second detecting means for detecting a state wherein the instruction is to be prefetched into said instruction buffer;

means for supplying information including the instruction code to said execution stage when said second detecting means detects the state wherein the instruction is to be prefetched and when said first detecting means detects that the instruction to be executed does not require memory access; and means for performing parallel control of fetch of the instruction into said instruction buffer and supply of the information including the instruction code to said execution stage when said second detecting means detects the state wherein the instruction is to be prefetched and when said first detecting means detects that the instruction to be executed does not require memory access.

BRIEF DESCRIPTION OF THE DRAWINGS

Other objects and features of the present invention will become apparent from the following description taken in connection with the accompanying drawings in which:

FIGS. 4A through 4G are timing charts of clock signals which are supplied by the clock pulse generator shown in FIG. 1 when an instruction fetch requiring memory access is performed during the instruction supplement processing, in the embodiment shown in FIG. 1; and FIGS. 5A through 5G are timing charts of the clock signals supplied by the clock pulse generator shown in FIG. 1 when an instruction fetch which does not require memory access is performed during the instruction supplement processing, in the embodiment shown in FIG. 1.

DETAILED DESCRIPTION OF THE PREFERRED EMBODIMENTS

Figure 1:
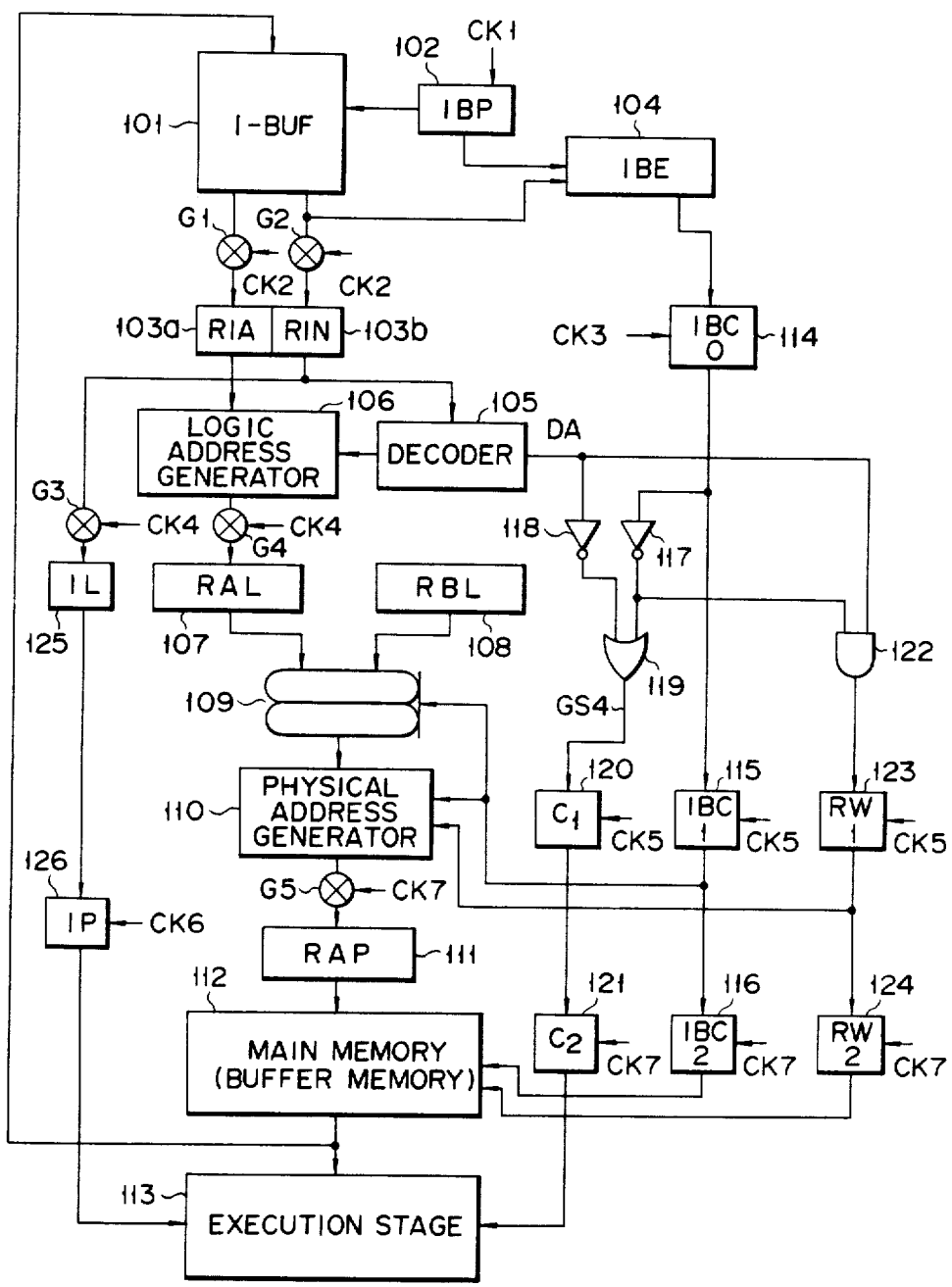
FIG. 1 is a block diagram of an instruction prefetch system according to an embodiment of the present invention.

FIG. 1 is a block diagram of an instruction prefetch system according to an embodiment of the present invention. An instruction buffer 101 (to be referred to as an I-BUF for brevity hereinafter) is connected to a main memory (or buffer memory) 112 and stores a plurality of instruction words prefetched from the main memory 112. The location of the I-BUF 101 is pointed by a pointer 102 (to be referred to as an IBP for brevity hereinafter) which is connected to the I-BUF 101. Registers 103a and 103b (to be referred to for brevity hereinafter as RIA and RIN, respectively) are connected to the output end of the I-BUF 101. Of the instruction words produced from the I-BUF 101, the address data of the operand is stored in the RIA 103a and the instruction code is stored in the RIN 103b. An I-BUF empty detector 104 (to be referred to as an IBE for brevity hereinafter) is connected to the IBP 102 and to the I-BUF 101 to detect the state (empty state) wherein an instruction is to be fetched into the I-BUF 101 based on the contents in the IBP 102 and on the length of the instruction word (e.g., a 2-byte instruction and a 4-byte instruction) fetched from the I-BUF 101. In this embodiment, when the IBE 104 detects the empty state, it produces a signal of logic level "1". A decoder 105 is connected to the RIN 103b, decodes the contents therefrom, and produces various control signals for instruction fetch such as memory access of an operand. A control signaL DA from the decoder 105 indicates whether or not the instruction to be executed requires memory access. In this embodiment, the control signal DA is logic level "0" when memory access is not required and is logic level "1" when memory access is required. A logic address generator 106 is connected to the RIA 103a and generates an operand logic address from the contents therefrom. The operand logic address generated by the logic address generator 106 is stored in a register 107 (to be referred to as an RAL for brevity hereinafter) through a gate G4. A memory address of the instruction to be supplemented or prefetched in the I-BUF 101 is stored in a register 108 (to be referred to as an RBL for brevity hereinafter). A selector 109 is connected to the RAL 107 and the RBL 108 to select one of the addresses supplied therefrom. The output from the selector 109 is supplied to a physical address generator 110 which converts the input address into the address for memory access, that is, into a physical address. The physical address from the physical address generator 110 is stored in a register 111 (to be referred to as an RAP for brevity hereinafter) through a gate G5. The output from the RAP 111 is supplied to the main memory 112. The output from the main memory 112 is supplied to the I-BUF 101 as well as to an execution stage 113. The execution stage used herein is a stage which executes a microprogram corresponding to a user instruction (macroinstruction) read out in the manner as described above.

The output signal from the IBE 104 is supplied to an inverter 117 through a flag flip-flop 114 (to be referred to as an IBC0 for brevity hereinafter). The output signal from the IBE 104 is supplied to the selector 109 and to the physical address generator 110 through the IBC0 114 and a flag flip-flop 115 (to be referred to as an IBC1 for brevity hereinafter) and is also supplied to the main memory 112 through the IBC0 114, IBC1 115 and a flag flip-flop 116 (to be referred to as an IBC2 for brevity hereinafter). The output signal from the inverter 117 is supplied to one input terminal of an OR gate 119, and the control signal DA from the decoder 105 is supplied to the other input terminal of the OR gate 119 through an inverter 118. An output GS4 from the OR gate 119 is supplied to a flag flip-flop 120 (to be referred to as a C1 for brevity hereinafter). The output from the C1 120 is supplied to a flag flip-flop 121 (to be referred to as a C2 for brevity hereinafter), the output from which is supplied to the execution stage 113. The IBC0 114, IBC1 115, and IBC2 116 are flip-flops which sequentially transfer the output signal from the IBE 104 to the next stages. The C1 120 and C2 121 are D flip-flops which sequentially transfer the output GS4 from the OR gate 119 to the next stages.

Meanwhile, the output signal from the inverter 117 and the control signal DA from the decoder 105 are supplied to an AND gate 122. In response to these signals, the AND gate 122 produces a signal of logic level "1" which indicates memory access for processing other than the instruction supplement processing. The output signal from the AND gate 122 is supplied to the physical address generator 110 through a flag flip-flop 123 (to be referred to as an RW1 for brevity hereinafter) and is also supplied to the main memory 112 through the RW1 and a flag flip-flop 124 (to be referred to as an RW2 for brevity hereinafter). The instruction code stored in the RIN 103b is supplied to the execution stage 113 through a register 125 (to be referred to as an IL for brevity hereinafter) and a register 126 (to be referred to as an IP for brevity hereinafter).

Figure 3:
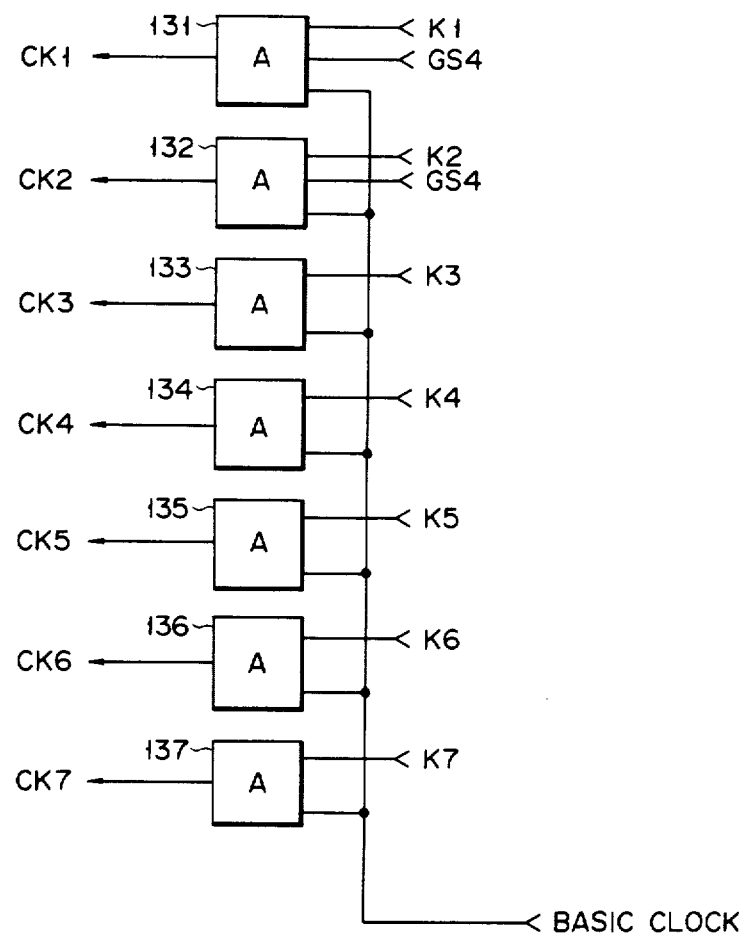
FIG. 3 is a block diagram of a clock pulse generator for supplying clock signals to the respective parts of the system according to the embodiment shown in FIG. 1.

FIG. 3 is a block diagram of a clock pulse generator for generating clock signals to be supplied to the respective parts of the system of the embodiment shown in FIG. 1. Reference clock signals are commonly supplied to the input terminals of AND gates 131 through 137, and control signals k1 through k7 are respectively supplied thereto. In this embodiment, the control signals k1 through k7 are all logic level "1". The output signal GS4 from the OR gate 119 is supplied to the AND gates 131 and 132. These AND gates 131 through 137 produce clock signals ck1 through ck7 at the timings as shown in FIGS. 4A through 4G and FIGS. 5A through 5G.

The mode of operation of the system according to the embodiment described above will now be described with reference to FIGS. 2A and 2B, FIGS. 4A through 4G and FIGS. 5A through 5G. The mode of operation for instruction fetch which requires memory access during instruction prefetch will first be described with reference to FIG. 2A and FIGS. 4A through 4G. In this case, in an operation step T1, an instruction word is read out from the I-BUF 101. Since the clock signal ck2 as shown in FIG. 4B is supplied to gates G1 and G2, the gates G1 and G2 are rendered conductive and the instruction word is latched in the RIA 103a and RIN 103b. The clock signal ck1 as shown in FIG. 4A is supplied to the IBP 102 to update the contents in the IBP 102. If the IBE 104 detects the empty state of the I-BUF 101 from the contents of the IBP 102 and the I-BUF 101, the IBE 104 supplies a detection signal of logic level "1" to the IBC0 114. Since the clock signal ck3 as shown in FIG. 4C is supplied to the IBC0 114 at this time, the IBC0 114 is set.

Figure 2A:
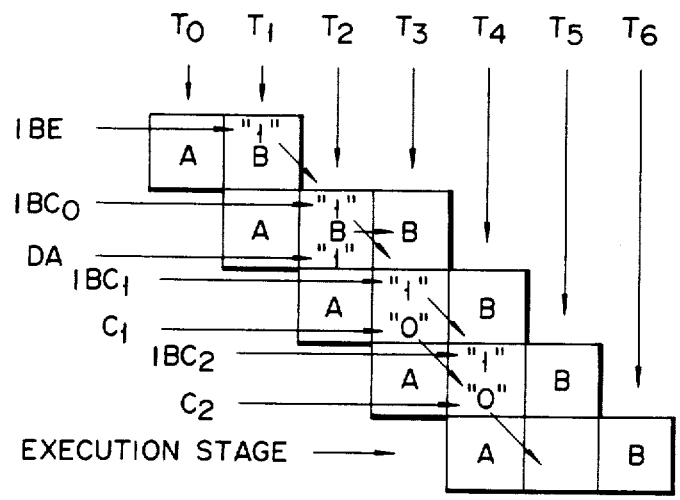
FIGS. 2A and 2B are views for explaining the instruction supplement processing and the instruction fetch operation respectively according to the embodiment shown in FIG. 1.
Figure 2B:
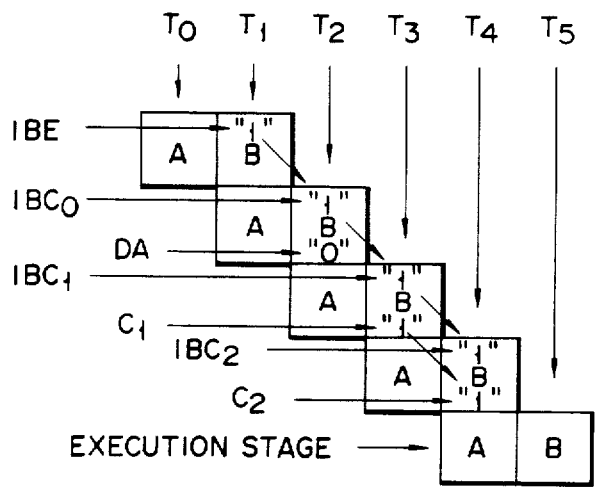

In an operation step T2, in accordance with the contents (instruction code) of the RIN 103b, the decoder 105 produces a control signal DA which indicates that an instruction in question requires memory access. Since the IBC0 114 is set or at logic level "1", the output signal from the OR gate 119 is at logic level "0". On the other hand, since the clock signal ck2 shown in FIG. 4B is not supplied to the gates G1 and G2, these gates G1 and G2 are rendered nonconductive. Therefore, the address data of the operand latched in the RIA 103a and the instruction-code latched in the RIN 103b are held for one period T as shown in FIG. 2A. The counting operation of the IBP 102 is also prohibited. The output signal (logic level "0") from the OR gate 119 is supplied to the C1 120. Since the clock signal ck5 as shown in FIG. 4E is supplied to the C1 120, the C1 120 is reset (logic level "0"). Since the clock signal ck5 is also supplied to the IBC1 115, the output signal (logic level "1") from the IBC0 114 is transferred to the IBC1 115. As a result, the address of an instruction to be prefetched which is stored in the RBL 108 is selected by the selector 109 and is supplied to the physical address generator 110. Since the clock signal ck7 as shown in FIG. 4G is supplied to a gate G5 at this time, the physical address of the instruction to be prefetched which is generated by the physical address generator 110 is latched in the RAP 111. The RBL 108 is then updated. The clock signal ck4 as shown in FIG. 4D is supplied to gates G3 and G4. Then, the gates G3 and G4 are rendered conductive, the operand logic address from the logic address generator 106 is supplied to the RAL 107, and the instruction code stored in the RIN 103b is transferred to the IL 125.

At the end of an operation step T3, the clock signal ck7 as shown in FIG. 4G is supplied to the C2 121, IBC2 116, and the RW2 124, respectively. As a consequence, the output signal (logic level "0") from the C1 120 is supplied to the C2 121 to be latched therein. The output signal (logic level "1") from the IBC1 115 is supplied to the IBC2 116 to be latched therein. The output signal (logic level "0") from the RW1 123 is supplied to the RW2 124 to be latched therein. Thereafter, since the clock signal ck5 is supplied to the C1 120, IBC1 115 and RW1 123, the C1 120 goes to logic level "1", the IBC1 115 goes to logic level "0", and the RW1 123 goes to logic level "1".

In an operation step T4, the IBC2 116 is at logic level "1", and its output signal is supplied to the main memory 112 as a memory access signal for instruction prefetch. As a consequence, the data (instruction word) corresponding to the physical address latched in the RAP 111 is read out from the main memory 112. The data or prefetched instruction word read out from the main memory 112 is fetched in the I-BUF 101. Thus, the instruction prefetch is performed. At this time, since the output signal from the IBC1 115 is at logic level "0", the selector 109 selects the RAL 107. Then, the operand logic address of the instruction which is latched in the RAL 107 is supplied to the physical address generator 110 which generates a corresponding operand physical address. Since the C2 121 is at logic level "0" in operation step T4, the flag data prohibits the execution of the instruction. Therefore, even if execution of a preceding instruction A is completed, execution of the next instruction B is not allowed in an operation step T5 and is held for one period T. At the end of the operation step T4, the clock signal ck7 is supplied to the gate G5, and the operand physical address generated by the physical address generator 110 is latched in the RAP 111. Since the clock signal ck7 is supplied to the C2 121, IBC2 116, and RW2 124 and the clock signal ck6 is supplied to the IP 126, the output signal of logic level "1" from the C1 120 is transferred to the C2 121, that of logic level "0" from the IBC1 115 is transferred to the IBC2 116, that of logic level "1" from the RW1 123 is transferred to the RW2 124, and the instruction code from the IL 125 is transferred to the IP 126.

In an operation step T5, the operand is fetched according to the memory access signal of logic level "1" from the RW2 124 and the operand physical address stored in the RAP 111, and the data (operand data) corresponding to the operand physical address of the RAP 111 is read out from the main memory 112. During this operation, since the C2 121 is at logic level "1" which enables execution of the instruction, instruction processing start by the execution stage 113 is performed in operation step T6. In operation step T6, the execution stage 113 receives the flag data of logic level "1" indicating execution enable of the instruction from the C2 121, and also receives the instruction code from the IP 126 and the operand data from the main memory 112. The execution stage 113 starts processing of the instruction.

The mode of operation for instruction fetch which does not require memory access during instruction prefetch will now be described with reference to FIG. 2B and FIGS. 5A through 5G. In this case, in an operation step T1, an instruction word is produced from the I-BUF 101. Since the clock signal ck2 as shown in FIG. 5B is supplied to the gates G1 and G2 at this time, the gates G1 and G2 are rendered conductive and the instruction word is latched in the RIA 103a and RIN 103b. The clock signal ck1 shown in FIG. 5A is supplied to the IBP 102 to update the contents therein. If the IBE 104 detects an empty state of the I-BUF 101 from the contents of the IBP 102 and the I-BUF 101, it supplies a detection signal of logic level "1" to the IBC0 114. Since the clock signal ck3 as shown in FIG. 5C is supplied to the IBC0 114, the IBC0 114 is set.

In an operation step T2, in accordance with the contents (instruction code) of the RIN 103b, the decoder 105 produces a control signal DA of logic level "0" which indicates that the instruction involved does not require memory access. The control signal DA is inverted by the inverter 118, and the inverted signal is supplied to the OR gate 119. As a result of this, the output from the OR gate 119 goes to logic level "1". Meanwhile, since the clock signal ck4 as shown in FIG. 5D is supplied to the gates G3 and G4, these gates G3 and G4 are rendered conductive. Then, the operand logic address obtained from the logic address generator 106 in accordance with the contents of the RIA 103a is supplied to the RAL 107, and the instruction code stored in the RIN 103b is supplied to the IL 125. The output signal (logic level "1") from the OR gate 119 is supplied to the C1 120. Since the clock signal ck5 as shown in FIG. 5E is supplied to the C1 120 at this time, the C1 120 is set. Since the clock signal ck5 is also supplied to the IBC1 115, the output signal (logic level "1") from the IBC0 114 is transferred to the IBC1 115. The address of the instruction to be prefetched which is stored in the RBL 108 is selected by the selector 109 to be supplied to the physical address generator 110. Since the clock signal ck7 as shown in FIG. 5G is supplied to the gate G5 at this time, the physical address of the instruction to be prefetched which is generated by the physical address generator 110 is latched in the RAP 111. The RBL 108 is then updated.

At the end of an operation step T3, the clock signal ck7 is supplied to the C2 121, IBC2 116, and RW2 124. The output signal (logic level "1") from the C1 120 is supplied to the C2 121, and the output signal (logic level "1") from the IBC1 115 is supplied to the IBC2 116. Since the control signal DA is at logic level "0" at this time, the output signal from the AND gate 122 is at logic level "0". In response to the clock signal ck5, the signal of logic level "1" is latched in the RW1 123. Therefore, the signal of logic level "0" is latched in the RW2 124 in response to the clock signal ck7. The instruction code in the IL 125 is transferred to the IP 126.

In an operation step T4, the IBC2 116 is at logic level "1" and its output signal is supplied to the main memory 112 as a memory access signal for instruction prefetch. Then, the data (instruction data) corresponding to the physical address latched in the RAP 111 is read out from the main memory 112. The data or prefetched instruction word read out from the main memory 112 is fetched in the I-BUF 101. In this manner, the instruction prefetch is performed. On other hand, since the C2 121 is at logic level "1", its output signal is supplied to the execution stage 113. The instruction A is executed by the execution stage 113 in parallel to instruction prefetch.

What is claimed is:

1. A pipelining information processor comprising:
  (a) a memory;
  (b) an instruction buffer coupled to said memory so as to receive prefetched instructions from said memory;
  (c) means for executing instructions;
  (d) a memory access unit including:
    (i) an address generator coupled to receive an input from said instruction buffer and to generate therefrom a logical address output; and (ii) means for address modification receiving a logical address as an input and providing a physical address output to said memory;

(e) means for fetching an instruction from said instruction buffer to said means for executing;

(f) means, operating in parallel with said means for fetching, for providing an input to said means for address modification including:
  (i) first means to detect if the input provided to said address generator requires a memory access to obtain an operand, and to cause said means for providing to couple the output of said address generator to said means for address modification if the input requires a memory access; and
  (ii) second means to detect a need to prefetch an instruction to said instruction buffer, and to cause said means for providing to couple an address of an instruction to be prefetched to said means for address modification, if said second means to detect detects said need and if said first means to detect does not detect that the input provided to said address generator requires a memory access to obtain an operand, whereby fetching of an instruction for execution and prefetching an instruction to said instruction buffer occurs simultaneously; and (g) control means for sequentially moving instruction addresses through said means for providing, said instruction buffer, said address generator, and said means for address modification in response to a series of clock pulses in such a manner that address generation, address modification, instruction fetching, and instruction execution occurs in parallel on successive instruction.

2. A system according to claim 1, wherein said first means to detect comprises a decoder for decoding the instruction to be executed.

* * * * *